United States Patent [19]

Laisney et al.

[11] Patent Number: 4,631,299

[45] Date of Patent: Dec. 23, 1986

[54] BURN RESISTANT ORGANOPOLYSILOXANE FOAMS

[75] Inventors: Bernard Laisney, Sainte-Foy Les Lyon; Maurice Duvernay, Saint-Genis Laval, both of France

[73] Assignee: Rhone-Poulenc Specialites Chimiques, Courbevoie, France

[21] Appl. No.: 827,881

[22] Filed: Feb. 10, 1986

[30] Foreign Application Priority Data

Feb. 8, 1985 [FR] France .................. 85 01764

[51] Int. Cl.$^4$ .................................. C08J 9/04
[52] U.S. Cl. .......................... 521/77; 521/134; 521/154; 524/8; 524/60; 524/861; 524/862; 525/474; 525/477; 528/15; 528/31; 528/32
[58] Field of Search .......... 528/15, 31, 32; 524/8, 524/60, 861, 862; 525/474, 477; 521/134, 154, 77

[56] References Cited

U.S. PATENT DOCUMENTS 3,923,705 12/1975 Smith .................. 521/154
4,189,545 2/1980 Modic .................. 521/154
4,418,157 1/1983 Modic .................. 521/154

FOREIGN PATENT DOCUMENTS 2065661 7/1981 United Kingdom .

*Primary Examiner*—Morton Foelak
*Attorney, Agent, or Firm*—Burns, Doane, Swecker & Mathis

[57] ABSTRACT

Organopolysiloxane compositions adopted for easy conversion into burn resistant foams useful, e.g., for the protection of nuclear power installations, include admixture of various organopolysiloxane polymers comprising SiH, SiOH, SiR$_3$ and Si-vinyl functions, and notably a hydroxylated liquid resin containing CH$_3$SiO$_{1.5}$ and (CH$_3$)$_2$SiO units, or reaction product of a hydroxylated MQ resin with a hydroxylated polyorganosiloxane oil, or mixture thereof.

12 Claims, No Drawings

BURN RESISTANT ORGANOPOLYSILOXANE FOAMS

BACKGROUND OF THE INVENTION

1. Field of the Invention

The present invention relates to organopolysiloxane compositions which can be converted into silicone foams having improved burn resistance, and, more especially, to compositions comprising a mixture of organopolysiloxane polymers bearing the reactive groups SiH, SiOH, and Si-vinyl; they are converted into foams and cured by platinum catalysis.

2. Description of the Prior Art

Organopolysiloxane compositions which can be converted into foams and are catalyzed by a platinum derivative are known to this art. They are described in the patent and other literature, especially in U.S. Pat. Nos. 3,923,705; 4,189,545; 4,418,157, and British Pat. No. 2,065,661.

In U.S. Pat. No. 3,923,705 a process is described for the preparation of silicone foams which consists of mixing an organohydropolysiloxane containing at least three SiH groups per mole, a hydroxylated organopolysiloxane containing more than one and up to 2.5 hydroxyl radicals per mole and a platinum catalyst in a proportion of 5 to 200 parts of platinum per million parts of the composition, with the organohydropolysiloxane and the hydroxylated organopolysiloxane present in sufficient quantities to provide a ratio of the SiH groups to the SiOH groups of 2.5 to 40. A triorganosiloxy-blocked diorganopolysiloxane containing, on average, two vinyl radicals per mole may be added to the composition.

U.S. Pat. No. 4,189,545 relates to a composition for a silicone foam which resists burning, comprising 100 parts of a triorganosiloxy-blocked diorganopolysiloxane containing 0.0002 to 3% of vinyl radicals, 0 to 200 parts of a filler, 100 to 15,000 parts per million of water, 1 to 50 parts of a diorganopolysiloxane bearing SiH groups, having a viscosity of 5 to 100 mPa·s at 25° C., and 1 to 250 parts per million of a platinum catalyst.

British Pat. No. 2,065,661 describes a silicone composition which can be converted into a foam which resists burning, comprising 100 parts of a triorganosiloxy-blocked diorganopolysiloxane containing from 0.0002 to 3% of vinyl radicals, 1 to 10 parts of an organopolysiloxane containing 2 to 10% of hydroxyl radicals, having a viscosity of 10 to 100 mPa·s at 25° C., 0 to 200 parts of a filler, 1 to 50 parts of a diorganopolysiloxane bearing SiH groups, having a viscosity of 5 to 100 mPa·s at 25° C., and 1 to 250 parts per million of a platinum catalyst. The composition may additionally contain 10 to 100 parts of a copolymer based on triorganosiloxy and $SiO_2$ units, or of another copolymer based on triorganosiloxy, diorganosiloxy and $SiO_2$ units, the ratio of the triorganosiloxy units to the $SiO_2$ units in the two copolymers being 0.5 to 1, with the diorganosiloxy units representing 1 to 10% of all of the units in the second copolymer; 2.5 to 10 of the silicon atoms in the two copolymers bear vinyl radicals.

U.S. Pat. No. 4,418,157 relates to a process for the preparation of a silicone foam of reduced density, which consists of mixing a composition which can be converted into a foam (based on a diorganopolysiloxane, an organohydropolysiloxane and a platinum catalyst) with an effective amount, in order to reduce foam density, of a copolymer consisting of triorganosiloxy and $SiO_2$ units or of another copolymer consisting of triorganosiloxy, diorganosiloxy and $SiO_2$ units, the ratio of the triorganosiloxy units to the $SiO_2$ units being 0.25 to 0.8 and the ratio of the diorganosiloxy units to the $SiO_2$ units being 0 to 0.1.

Compositions prepared according to the aforementioned patents produce foams of good quality, that is to say, having the required density and quite good burn resistance. However, these compositions are sometimes difficult to prepare and to use because they require a highly active platinum catalyst and/or scrupulous metering of the distribution of their components.

Furthermore, the foams obtained do not always have sufficient burn resistance. Excellent flame resistance is necessary, however, because silicone foams are often used to protect essential components such as electrical cables or electronic relays which are attached, for example, to devices for processing hazardous products, or to devices for transporting human beings. In the event of a fire, the poor working state of these components could interfere with the operation of warning or safety systems.

SUMMARY OF THE INVENTION

Accordingly, a major object of the present invention is the provision of improved silicone compositions which, on the one hand, can be converted into foams which have remarkable burn resistance, and, on the other, are easy to prepare and use, whatever the required foam density. These advantages are provided by the combination of organopolysiloxanes containing SiH, Si-vinyl and SiOH groups, together with triorganosiloxy-blocked diorganopolysiloxanes which do not contain reactive radicals and liquid organopolysiloxane resins containing hydroxyl radicals. A liquid resin of this type can be prepared by reacting an $\alpha,\omega$-dihydroxylated diorganopolysiloxane oil of a determined viscosity with a resin consisting of trimethylsiloxy and $SiO_2$ units, containing at least 0.6% of hydroxyl radicals bonded to silicon atoms; similar resins are noted in U.S. Pat. No. 3,205,283.

Briefly, the present invention features compositions which can be converted into flame resistant foams, and which comprise:

(A) 100 parts of a diorganopolysiloxane oil blocked at each end of its polymer chain by a vinyl diorganosiloxy unit, in which the organic radicals bonded to the silicon atoms are methyl, ethyl, n-propyl, vinyl, phenyl, and/or 3,3,3-trifluoropropyl radicals, and said oil having a viscosity of 100 to 250,000 mPa·s at 25° C.;

(B) 50 to 100 parts of a diorganopolysiloxane oil blocked at each end of its polymer chain by a triorganosiloxy unit, in which the organic radicals bonded to the silicon atoms are methyl, ethyl, phenyl and/or 3,3,3-trifluoropropyl radicals, and said oil having a viscosity of 10 to 5,000 mPa·s at 25° C.;

(C) 25 to 180 parts of a diorganopolysiloxane oil blocked at each end of its polymer chain by a hydroxyl radical, in which the organic radicals bonded to the silicon atoms are methyl, ethyl, phenyl and/or 3,3,3-trifluoropropyl radicals, and said oil having a viscosity of 5 to 10,000 mPa·s at 25° C.;

(D) 10 to 150 parts of a liquid resin selected from among:

(i) a resin containing units of the formulae $CH_3SiO_{1.5}$ and $(CH_3)_2SiO$, with a $CH_3/Si$ ratio of 1.1 to 1.6, having a weight content of 1 to 6% of hydroxyl radicals bonded to the silicon atoms, and having a viscosity of 1,500 to 20,000 mPa·s at 25° C., (2i) a reaction product prepared from a solution, in an organic solvent, of a silicone resin containing units of the formulae $(CH_3)_3SiO_{.5}$ and $SiO_2$, whose molar ratio $(CH_3)_3SiO_{0.5}/SiO_2$ is 0.4 to 1.2, having 0.6 to 5.5 mole percent of hydroxyl radicals bonded to the silicon atoms, and of a diorganopolysiloxane oil blocked at each end of its polymer chain by a hydroxyl radical bonded to the terminal silicon atom, in which the organic radicals bonded to the silicon atoms are methyl, ethyl, phenyl and/or 3,3,3-trifluoropropyl radicals, said oil having a viscosity of 10 to 4,000 mPa·s at 25° C., by heating the mixture of the two reactants, to a temperadure above 80° C. for the time required to remove the organic solvent, the weight ratio of the silicone resin to the diorganopolysiloxane oil being 0.1 to 1.0, or (3i) the mixture of the resin (i) with the reaction product (2i), the weight ratio of resin (i) to the reaction product (2i) ranging from 0.2 to 5;

(E) 10 to 40 parts of a liquid organohydropolysiloxane polymer containing at least three SiH groups per mole;

(F) 30 to 90 parts of an inorganic and/or metal filler; and (G) 0.001 to 0.05 part of platinum metal in the form of an organic and/or inorganic platinum derivative.

DETAILED DESCRIPTION OF THE INVENTION

More particularly according to the present invention, the diorganopolysiloxane oil (A), having a viscosity of 100 to 250,000 mPa·s at 25° C., preferably 600 to 200,000 mPa·s at 25° C., is advantageously a linear polymer comprising a sequence of diorganosiloxy units blocked at the end of the chain by a vinyldiorganosiloxy unit. The organic radicals bonded to the silicon atoms in the polymer are selected from among methyl, ethyl, n-propyl, vinyl, phenyl and 3,3,3-trifluoropropyl radicals; at least 60% of these radicals are methyl radicals, not more than 20% are phenyl radicals and not more than 2% are vinyl radicals (this percentage does not include the vinyl radicals situated at the end of a chain).

Units of the following formulae are representative of specific examples of such diorganosiloxy units:

$(CH_3)_2SiO$, $CH_3(CH_2=CH)SiO$, $CH_3(C_6H_5)SiO$, $(C_6H_5)_2SiO$, $CH_6(n-C_5H_2)SiO$, $CH_3(n-C_3H_7)SiO$, $CH_3(C_6H_5)SiO$, $CF_3CH_2CH_2-(CH_3)SiO$.

A dimethylpolysiloxane oil blocked at each end of its chain by a dimethyl vinyl siloxy unit or a methyl phenyl vinyl siloxy unit, having a viscosity of 600 to 150,000 mPa·s at 25° C., is preferably used.

The oil is commercially available from silicone producers; furthermore, it may be produced, for example, by polycondensing and rearranging, in the presence of a catalyst, the product of hydrolysis of a mixture of a diorganovinylchlorosilane and a diorganodichlorosilane. It can also be prepared by the polymerization of a diorganocyclopolysiloxane, such as octamethylcyclotetrasiloxane, with the aid of an alkaline or acidic catalyst, in the presence of a suitable amount of a chain-blocking agent such as that of the formula:
$R(CH_2=CH)CH_3SiO[Si(CH_3)_2O]_n$-

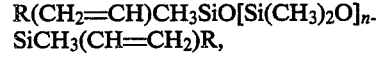

wherein R is a methyl or phenyl radical and n is any numeber from 0 to 20.

After the polymerization reaction has reached equilibrium, the catalyst is neutralized and the volatile compounds are removed by distillation. The oil (A) may be used either by itself or in the form of a mixture of oils (A) which differ among themselves in the value of their viscosity. Insofar as the foaming compositions are packaged as two components, it is also possible to add an oil of relatively low viscosity, for example 1,000 to 20,000 mPa·s at 25° C. to one of the two components, and another, of higher viscosity, for example from 60,000 to 150,000 mPa·s at 25° C., to the other component. This process makes it possible to adjust the viscosity of the two components.

The diorganopolysiloxane oil (B) is advantageously used in a proportion of 50 to 100 parts, preferably 55 to 95 parts per 100 parts of the vinylated oil (A); it is a linear polymer blocked by a triorganosiloxy unit at the end of the chain, and having a viscosity of 10 to 5,000 mPa·s at 25° C., preferably 15 to 3,500 mPa·s at 25° C. The organic radicals bonded to the silicon atoms in the polymer are selected from among methyl, ethyl, phenyl and 3,3,3-trifluoropropyl radicals; at least 70% of these radicals are methyl radicals and not more than 15% are phenyl radicals.

Exemplary of diorganopolysiloxy units defining the linear concatenation of the oil (B), representative are those of the formulae $(CH_3)_2SiO$, $CH_3(C_6H_5)SiO$, $(C_6H_5)_2SiO$, $CH_3(C_6H_5)SiO$, and $CF_3CH_2CH_2-(CH_3)SiO$.

Exemplary chain-blocking units are those of the formulae $(CH_3)_3SiO_{0.5}$, $(CH_3)_2C_6H_5SiO_{0.5}$, $(CH_3)_2(C_2H_5)SiO_{0.5}$, and $CF_3CH_2CH_2(CH_3)_2-SiO_{0.5}$.

A dimethyl polysiloxane oil blocked at each end of its chain by a trimethylxiloxy or a dimethylphenylsiloxy unit, having a viscosity of 15 to 3,000 mPa·s at 25° C., is preferably used.

The oil (B) is also commercially available from silicone producers; furthermore, it can be prepared by following the procedures described earlier for the prepparation of the oil (A); however, the organochlorosilanes employed in the polycondensation reaction, and the diorganocyclopolysiloxanes and the chain-blocking polymers employed in the polymerization reaction bear organic radicals bonded to silicon atoms which are selected only from among methyl, ethyl, phenyl and 3,3,3-trifluoropropyl radicals. An oil (B) may be used by itself or in the form of a mixture of oils (B) which differ from each other in their viscosity value.

Insofar as the foaming compositions of the invention are packaged as two components, this makes it possible to distribute the oil (B) between the two components and, consequently, to add, if desired, an oil (B) of low viscosity, for example from 15 to 100 mPa·s at 25° C., to one of the components, and a more viscous oil, for example from 100 to 2,500 mPa·s at 25° C., to the other component.

The $\alpha,\omega$-dihydroxylated diorganopolysiloxane oil (C) is advantageously present in a proportion of 25 to 180 parts, preferably 30 to 150 parts, per 100 parts of the vinylated oil (A).

This is a linear polymer having a viscosity of 5 to 10,000 mPa·s at 25° C., preferably 10 to 8,000 mPa·s at 25° C., blocked by a hydroxyl radical at each end of its chain; the organic radicals bonded to the silicon atoms are selected from among methyl, ethyl, phenyl and 3,3,3-trifluoropropyl radicals, at least 80% of these radicals being methyl radicals and not more than 10% being phenyl radicals.

Exemplary of diorganosiloxy units which form the linear backbone of the oil, representative are those of the following formulae: $(CH_3)_2SiO$, $CH_3-(C_2H_5)SiO$, $CH_3(C_6H_5)SiO$, $(C_6H_5)_2SiO$, and $CH_3(CF_3CH_2CH_2)-SiO$.

A dimethylpolysiloxane oil which is blocked at each end of its chain by a hydroxyl radical bonded to the terminal silicon atom, having a viscosity of 10 to 5,000 mPa·s at 25° C. is preferably used. The oil (C) may be used by itself or in the form of a mixture with one or more other oils (C) which differ from each other in their viscosity values.

In one embodiment of the invention, it is recommended to use a mixture containing, for example, from 23 to 140 parts of an oil (C) having a viscosity of 300 to 8,000 mPa·s at 25° C. and 2 to 40 parts of another oil (C) having a viscosity of 5 to 150 mPa·s at 25° C., per 100 parts of vinylated oil (A). In specific foaming compositions the presence of the low-viscosity oil (C) can promote the formation of foams which have both a low density, for example below 300 kg/m$^3$, and a fine and uniform cell structure.

The oil (C) is also a commercially available silicone; furthermore, it can be manufactured by following the aforenoted method for the polymerization of diorganocyclopolysiloxanes, described for the preparation of the oil (A). However, the chain-blocker used in this latter preparation is, in this case, replaced by water and/or an α,ω-dihydroxylated diorganopolysiloxane of a low molecular weight, for example, one containing 2 to 30 silicon atoms in its chain.

The liquid resin (D) is advantageously used in a proportion of 10 to 150 parts, preferably 15 to 135 parts, per 100 parts of the vinylated oil (A).

It may be selected from among resins containing the resin (i) and including units of the formulae $CH_3SiO_{1.5}$ and $(CH_3)SiO$, with a $CH_3/Si$ ratio of 1.05 to 1.65, preferably 1.10 to 1.6, having, simultaneously, a weight content of 0.9 to 6%, preferably 1 to 5.50%, of hydroxyl radicals bonded to silicon atoms, and a viscosity of 1500 to 20,000 mPa·s at 25° C., preferably 2000–18,000 mPa·s at 25° C.

The liquid resin (i) can be prepared by cohydrolysis (preferably in an organic solvent medium such as ethyl ether or toluene) of a mixture of methyl trichlorosilane and dimethyl dichlorosilane having the required $CH_3/Si$ ratio, namely, 1.05 to 1.65; such a procedure is described, in particular, in U.S. Pat. No. 2,985,544.

Among the resins (i), the use of those containing at least 2.9, and capable of containing in excess of 10 hydroxyl radicals per mole, is recommended. The resins with this characteristic have, for example, a number average molecular mass $\overline{Mn}$ of 2,000 to 5,000 at a hydroxyl radical weight content of 2.5 to 4%.

The liquid resin (D) may also be selected from among the resins containing the reaction product (2i) formed by heating a mixture of a solution of an MQ resin in an organic solvent with a diorganopolysiloxane oil blocked at each end of its chain by a hydroxyl radical bonded to the terminal silicon atom. The MQ resin contains $(CH_3)_3SiO_{0.5}$ and $SiO_2$ units distributed in a $(CH_3)_3SiO_{0.5}/SiO_2$ molar ratio of 0.4 to 1.2, preferably 0.5 to 1.1, and having a weight content of hydroxyl radicals bonded to silicon atoms of 0.6 to 5.5%, preferably of 0.3 to 5%.

It is stored in solution in a usual organic solvent such as toluene, xylene, cumene, chlorobenzene, cyclohexane, methylcyclohexane, tetrachloroethane or trichlorotrifluoroethane. Its concentration in the solution may vary from 20 to 70% by weight. The MQ resin is a well known organopolysiloxane copolymer whose preparation may be carried out beginning with trimethylchlorosilane and/or hexamethyldisiloxane and sodium silicate; U.S. Pat. Nos. 2,676,182 and 2,857,356 provide the details of such preparation.

Among the MQ resins, the use of those containing at least 2.8 and capable of containing in excess of 20 hydroxyl radicals per mole is recommended.

The resins with this property have, for example, a number-average molecular mass $\overline{Mn}$ of 2,400 to 7,000 for a hydroxyl radical weight content of 2 to 5%.

The α,ω-dihydroxylated diorganopolysiloxane oil which is to react with the MQ resin is a linear polymer related to the oil (C); accordingly, it contains methyl, ethyl, phenyl or trifluoropropyl radicals; at least 80% of these radicals are methyl and not more than 10% are phenyl. This oil has a viscosity of 10 to 4,000 mPa·s at 25° C., preferably 15 to 3,500 mPa·s at 25° C. This range of values is narrower than that attributed to the oil (C), which is from 5 to 10,000 mPa·s at 25° C.

The description given earlier in respect of the preparation and the constitution of the hydroxylated oil (C) is completely applicable to the present hydroxylated oil having a viscosity of 10 to 4,000 mPa·s at 25° C. Preferably, an α,ω-dihydroxylated dimethyl polysiloxane oil having a viscosity of 15 to 2,500 mPa·s at 25° C. is used.

The mixture consisting of the solution of the MQ resin and of the hydroxylated oil having a viscosity of 10 to 4,000 mPa·s at 25° C. is made simply by stirring; the amounts of the two reactants which are used are such that the weight ratio MQ resin/α,ω-dihydroxylated oil is 0.1 to 1, and preferably 0.15 to 0.95. The homogeneous mixture obtained is heated, preferably above 80° C., at atmospheric pressure; it is then subjected to a subatmospheric pressure long enough to remove virtually all of the organic solvent from the MQ resin. The mixture may also be gradually heated above 80° C. while subjected to a subatmospheric pressure from the beginning of heating onwards. In another embodiment of the invention, it is possible not to mix the MQ resin solution with the hydroxylated oil beforehand, but to distil off the organic solvent from the resin solution, preferably under a subatmospheric pressure, and to add the α,ω-dihydroxylated diorganopolysiloxane oil in step with the removal of this solvent.

Whatever the procedure employed, it is recommended that the mixture not be raised to a temperature above 250° C.

The liquid mixture obtained when the reaction is complete constitutes the liquid resin (2i); it has a viscosity of 500 to 25,000 mPa·s at 25° C., preferably 800 to 20,000, and a weight content of hydroxyl radicals bonded to silicon atoms of 0.2 to 4.5%, preferably 0.3 to 4.2%.

The identity of the liquid resin (2i) (that is to say, the product of the reaction between the MQ resin and the α,ω-dihydroxylated diorganopolysiloxane oil) has not been clearly determined. However, this liquid resin has special properties, because it can be converted into a transparent resilient material, as indicated in U.S. Pat. No. 3,205,283.

Furthermore, it has been found, and it is also stated in U.S. Pat. No. 3,205,283, that mixing a solution of MQ resin in an organic solvent with an α,ω-dihydroxylated diorganopolysiloxane oil having a viscosity above 4,000 mPa·s, at 25° C., gives rise to a pseudogelled product, after most of the organic solvent has been removed by heating. This product is difficult to incorporate into the other components of the compositions of the invention.

The liquid resin (D) may also be selected from among resins containing the mixture of the resin (i) and of the reaction product (2i), the weight ratio resin (i)/reaction product (2i) having the value 0.2 to 5, preferably 0.3 to 4.5. The mixture, which is prepared by simply adding one of the two components to the other, is homogeneous and stable, which is unexpected, in view of the fact that silicone resins of different structures are poorly compatible with each other.

To produce this mixture, a reaction product (2i) is preferably used in which the original hydroxylated oil has been selected from $\alpha,\omega$-dihydroxylated dimethylpolysiloxane oils having a viscosity of 15 to 2,500 mPa·s at 25° C.

The liquid organohydropolysiloxane polymer (E) containing at least three SiH groups per mole is advantageously used in a proportion of 10 to 40 parts, preferably 12 to 38 parts, per 100 parts of the vinylated oil (A). This polymer corresponds to the average formula $G_xH_ySiO_{4-x-y/2}$ in which x is a number ranging from 1 to 1.99, preferably 1.05 to 1.95 and y is a number ranging from 0.1 to 1, preferably from 0.2 to 0.95, the total $x+y$ denotes a number ranging from 1.7 to 2.6, preferably 1.75 to 2.55, and G denotes a methyl, ethyl, n-propyl or phenyl radical, at least 80% of the radicals G being methyl radicals.

The above formula includes the polymers (E) with a linear, ring or branched structure.

A polymer (E) having a linear structure may correspond to the average formula:

$$G_{(3-t)}H_tSi[OSiG_2]_g[OSi(G)H]_hOSiH_tG_{(3-t)},$$

in which t is the number zero or one, g is a number ranging from 0 to 50, h is a number ranging from 3 to 90 and G has the same meaning as that given above in the description of the general formula.

Preferably, a polymer is used having a linear structure corresponding to the average formula:

$$(CH_3)_3Si[OSi(CH_3)_2]_g[OSi(CH_3)H]_hOSi(CH_3)_3,$$

in which g and h are as defined above.

A polymer (E) having a ring structure may correspond to the average formula:

$$[OSi(G)H]_{n1}[OSiG_2]_{n2}$$

in which n1 is a number ranging from 3 to 10 and n2 is a number ranging from zero to five and G is as defined above.

A polymer having a ring structure corresponding to the formula $[OSi(CH_3)H]_4$ or the formula $[OSi(CH_3)H]_3$ is preferably selected.

A polymer (E) having a branched structure contains at least one unit of the formulae $GSiO_{1.5}$, $SiO_2$ or $HSiO_{1.5}$, the remaining units being selected from those of the formulae $G_3SiO_{0.5}$, $HG_2SiO_{0.5}$, $G_2SiO$ and $H(G)SiO$, where G is again as defined above.

A polymer having a clearly determined branched structure may correspond to the average formula:

$$Q_wSi[(OSiG_2H)]_{w'}[(OSiG_3)_{w''}]_{4-w}$$

in which Q denotes g or H (G is again as defined above); w is the number zero or one; w' is the number 2, 3 or 4; w'' is the number zero or one and w' + w'' denotes the number 3 or 4; however, when w is zero, w' is the number 3 or 4; when w is 1 and Q denotes H, w' is the number 2 or 3; when w is 1 and Q denotes G, w' is the number 3.

A polymer having a branched structure corresponding to the formula $CH_3Si[OSi(CH_3)_2H]_3$ or to the formula $Si[OSi(CH_3)_2H]_4$ is preferably selected.

The inorganic and/or metal filler (F) is advantageously used in a proportion of 30 to 90 parts, preferably 35 to 85 parts, per 100 parts of the vinylated oil (A). It may be selected from among:

(1) the reinforcing fillers, such as fumed or precipitated silica, (2) semi-reinforcing or non-reinforcing fillers, such as ground quartz, diatomaceous silica, talc, mica, calcium carbonate, calcined clay; magnesium, titanium, iron, zinc, aluminum, lead or copper oxides, rare earth oxides and hydroxides (such as ceric oxide or ceric hydroxide), zinc silicate, barium sulfate, barium or zinc metaphosphate, lead borate, lead carbonate, zinc borate, calcium borate, barium borate or aluminum silicate, and (3) metal powders, such as those based on copper, iron, lead, aluminum or zinc.

Other fillers may be used, such as carbon black, in a proportion of 0.02 to 1 part, preferably 0.15 to 0.9 part per 100 parts of the vinylated oil (A). In some formulations, the presence of carbon black, which is free from sulfur or sulfur derivatives enables the burn resistance of the foams to be improved fairly significantly. In some cases it is possible to improve the burn resistance further by combining carbon black with ceric hydroxide, this hydroxide then being added in a proportion of 0.005 to 4 parts, preferably 0.01 to 3.5 parts, per 100 parts of the vinylated oil (A).

The platinum catalyst (G) is advantageously added such as to provide 0.001 to 0.05 part, preferably 0.0015 to 0.04 part of platinum, expressed as metal, per 100 parts of the vinylated oil (A).

This catalyst may be deposited onto inert carriers, such as silica gel, alumina, or carbon black. Preferably, an unsupported catalyst selected from among chloroplatinic acid, its hexahydrate form, its alkali metal salts, and its complexes with organic derivatives is, or are, used.

Particularly recommended are the reaction products of chloroplatinic acid with vinylpolysiloxanes such as 1,3-divinyltetramethyldisiloxane, which are treated or otherwise with an alkaline agent to partly or completely remove the chlorine atoms (U.S. Pat. Nos. 3,419,593; 3,775,452 and 3,814,730). Also recommended are the reaction products of chloroplatinic acid with alcohols, ethers and aldehydes (U.S. Pat. No. 3,220,972).

Other effective catalysts include platinum chelates and platinous chloride complexes with phosphines, phosphine oxides, and with olefins such as ethylene, propylene, and styrene (U.S. Pat. Nos. 3,159,601 and 3,552,327).

The production of the foam compositions according to the invention may be carried out by merely mixing the various components (A), (B), (C), (D), (E), (F) and (G) in any order of addition whatsoever, by means of suitable apparatus. It is desirable, nevertheless, to add the platinum catalyst (G) or the hydroorganopolysiloxane polymer (E) last. Compositions produced in this manner are immediately converted into foams at ambient temperature and above. However, to obtain foams of good quality the various components (A), (B), (C), (D), (F) and (G) must not only be added in accordance with the quantities specified earlier, but also, on the one hand, the weight content of the hydroxyl radicals contributed by the oil (C) and by the liquid resin (D) and, on the other hand, the proportion of radicals SiH contributed by the hydroorganopolysiloxane polymer (E) must be suitably selected such as to provide a molar ratio of the SiH radicals to the hydroxyl radicals of 1.2 to 25, preferably from 1.5 to 20.

Under these conditions, the foams produced have fine and uniform cells and have a density of 180 to 350 kg/m$^3$, preferably 200 to 290 kg/m$^3$.

It has also been found, furthermore, that the use of resin (i) or of the reaction product (2i), or of their mixture (3i), in the compositions of the invention does not lower the relative density of the foam when compared with the use of a mixture of hydroxylated oils by themselves, or of hydroxylated MQ resins by themselves.

These foams have fairly good flame resistance; nevertheless, to have a resistance which is still more effective, chiefly under conditions of use as fire arrest components, it is recommended to select the suitable quantities, the suitable molecular weight and the suitable weight proportion of hydroxyl radicals among the hydroxylated oils (C) and the hydroxylated liquid resins (D), such as to provide more than 2.5 and preferably more than 2.9 hydroxyl radicals per mole in the mixture in which these oils (C) and these resins (D) are blended.

Thus, by way of examples, assuming that use is made of:

(a) 100 g of a resin (D) (such as the liquid resin (i) of number-average molecular mass 4,000, and a hydroxyl radical content of 3%, i.e., containing 7 OH radicals per mole, (b) 100 g of a hydroxylated oil (C) having a number-average molecular weight of 10,000, containing two OH radicals per mole, (c) 50 g of a hydroxylated oil (C), having a number-average molecular mass of 500, containing two OH radicals per mole, a mixture is produced in which the three polymers are blended and which has an average value of 2.9 OH radicals per mole.

The resin (D) may no longer be the liquid resin (i) but the reaction product (2i) formed, as above indicated, from an MQ resin and a hydroxylated oil having a viscosity of 10 to 4,000 mPa·s at 25° C.; in this case, in order to determine the number of OH per mole of this resin (2i), whose structure is not well known, the characteristics of the starting materials are used as the basis, namely, the quantity used, the number-average molecular mass and the OH radical content of the MQ resin, and the quantity used and the number-average molecular mass of the hydroxylated oil.

Thus, the compositions of the invention which contain the components (C) and (D) whose mixture contains, on average, more than 2.5 and preferably more than 2.9 hydroxyl radicals per mole produce foams which resist burning very efficiently.

In particular, after these foams have been exposed for at least three hours to a flame whose temperature is at least 1,000° C., they are only partly destroyed and, in general, 20 to 40% of their mass remains practically unaffected.

The compositions of the invention may be prepared as indicated earlier, by simply mixing the various components, but these compositions are immediately converted into foam. To stabilize them, and to package them in the form of single-component compositions, an inhibitor must be added to the platinum catalyst (G). Such inhibitors are well known; amines, silazanes, oximes, dicarboxylic acid diesters, acetylenic alcohols, acetylenic ketones and vinyl methyl cyclopolysiloxanes (U.S. Pat. Nos. 3,445,420 and 3,989,667) are particularly representative.

The inhibitor is used in a proportion of 0.005 to 5 parts and preferably 0.01 to 3 parts per 100 parts of the vinylated oil (A).

The compositions which contain an inhibitor may be stable for several days at ambient temperature; to obtain the foams, when required, the compositions must be heated above 60° C., preferably above 100° C. Such a procedure has its limitations, however, and in the majority of cases the compositions according to the invention are packaged as two components; the inhibitor is left out or is added in a small amount, to control the time of foam formation.

One of the components may include, for example, a fraction of the vinylated oils (A), a fraction of the blocked oils (B), all of the hydroxylated oils (C), all of the liquid resins (D), a fraction of the fillers (F), and all of the catalysts (G).

The other component may include the remaining fraction of the vinylated oils (A), the remaining fraction of the blocked oils (B), the remaining fraction of the fillers (F), and all of the hydroorganopolysiloxane polymer (E).

By modifying the amounts of the various components which are employed and the viscosity of the polymers, two components can be devised such that their viscosities are not too high, for example, do not exceed 20,000 mPa·s at 25° C.

In the case of two-component packaging, a large number of solutions can be obtained, depending upon the amounts used and upon the number and the identity of the constituents forming part of each of the two components. It is recommended, however, that all the platinum catalyst (G) be placed in one of the components and that all the hydroorganopolysiloxane polymer (E) be placed into the other.

The foams resulting from the compositions according to the invention can be used in all fields of application which require effective fire protection.

In nuclear power stations, passage halls for electric cables are made in walls or ceilings; after the cables have been installed, a hollow space, which needs to be filled, is left is the passage regions; the compositions of the invention are outstandingly suitable for this purpose.

They are also suitable for filling empty spaces situated, for example, in cable ducts, in pipe ducts and in false ceilings, inside buildings.

They are also suitable for plugging holes and fissures which appear in concrete and masonry structures and in paved tracks.

Lastly, they are suitable in the fields of application which make use of flexible, lightweight, flame-resistant and aging-resistant materials, such as the shielding of electronic components, and the manufacture of buffers and cushions.

In order to further illustrate the present invention and the advantages thereof, the following specific examples are given, it being understood that same are intended only as illustrative and in nowise limitative.

EXAMPLES 1 to 6

Two compositions $A_1$ and $B_1$, which were mixed in the weight ratio 1/1 at the time of use, were used to produce foams. These two compositions were formed from the constituents selected from those described below:

(1) a dimethylpolysiloxane oil blocked by a vinyl dimethyl siloxy unit at each end of its chain, having:

(a) a viscosity of 100,000 mPa·s at 25° C.; this will be referred to as the vinylated dimethyl oil V 100,000, (b) a viscosity of 3,500 mPa·s at 25° C.; this will be referred to as the vinylated dimethyl oil V 3,500;

(2) a dimethylpolysiloxane oil blocked by a trimethylsiloxy unit at each end of its chain, having:

(a) a viscosity of 1,000 mPa·s at 25° C.; this will be referred to as the dimethyl oil V 1,000, (b) a viscosity of 100 mPa·s at 25° C.; this will be referred to as the dimethyl oil V 100, (c) a viscosity of 50 mPa·s at 25° C.; this will be referred to as the dimethyl oil V 50, (d) a viscosity of 20 mPa·s at 25° C.; this will be referred to as the dimethyl oil V 20; (3) a dimethylpolysiloxane oil blocked at each end of its chain by a hydroxyl radical bonded to the terminal silicon atom, having:

(a) a viscosity of 3,500 mPa·s at 25° C., an $\overline{Mn}$ of approximately 17,500 and a OH content of 0.2%; this will be referred to as the hydroxylated dimethyl oil V 3,500, (b) a viscosity of 750 mPa·s of 25° C., an $\overline{Mn}$ of approximately 9,500 and a OH content of 0.35%; this will be referred to as the hydroxylated dimethyl oil V 750, (c) a viscosity of 60 mPa·s at 25° C., an $\overline{Mn}$ of approximately 850 and a OH content of 4%; this will be referred to as the hydroxylated dimethyl oil V 60, (d) a viscosity of 35 mPa·s at 25° C., an $\overline{Mn}$ of approximately 450, a OH content of 9%; this will be referred to as the hydroxylated dimethyl oil V 35;

(4) a 60% solution of an MQ resin in toluene; this resin consisted of $(CH_3)_3SiO_{0.5}$ and $SiO_2$ units distributed in a $(CH_3)_3SiO_{0.5}/SiO_2$ molar ratio of 0.6; it contained 3.4% of OH radicals, its $\overline{Mn}$ was on the order of 5,000 (thus, it contained 10 OH radicals per mole); this will be referred to as MQ resin containing 3.4% of OH;

(5) a 60% solution of an MQ resin in toluene; this resin consisted of $(CH_3)_3SiO_{0.5}$ and $SiO_2$ units distributed in a $(CH_3)_3SiO_{0.5}/SiO_2$ molar ratio of 0.75; it contained 1.3% of OH radicals, its $\overline{Mn}$ was on the order of 6,000 (thus, it contained 4.5 OH radicals per mole); this will be referred to as the MQ resin containing 1.3% of OH;

(6) a liquid resin prepared according to the following procedure:

72 parts of the 60% solution of the MQ resin containing 3.4% of OH in toluene and 57 parts of the dimethyl oil V 20 were introduced into a distillation apparatus and the mixture was heated to 130° C. at atmospheric pressure; the apparatus was then placed under a pressure of 25 millibars, and the toluene and traces of water were removed in this manner. The liquid resin obtained, which was essentially free of toluene, had a viscosity of 750 mPa·s at 25° C.; it contained 43% of the MQ resin; it will be referred to as the liquid resin formed from MQ resin containing 3.4% of OH and from dimethyl oil V 20;

(7) a liquid resin prepared according to the following procedure:

68 parts of the 60% solution of the MQ resin containing 3.4% of OH in toluene and 60 parts of the vinylated dimethyl oil V 3,500 were introduced into a distillation apparatus. The mixture was heated to about 140° C. at atmospheric pressure and the apparatus was then placed under a pressure of 35 millibars; toluene and traces of water were removed in this manner. A liquid resin having a viscosity of 55,000 mPa·s at 25° C. and containing 40% of the MQ resin remained; it will be referred to as the liquid resin formed from MQ resins containing 3.4% of OH and from vinylated dimethyl oil V 3,500;

(8) a liquid resin prepared according to the following procedure:

68 parts of the 60% solution of the MQ resin containing 3.4% of OH in toluene and 60 parts of the hydroxylated dimethyl oil V 750 were introduced into a distillation apparatus. The mixture was heated to 140° C. at atmospheric pressure and the apparatus was then placed under a pressure of 30 millibars. Toluene and water were removed in this manner. A liquid resin having a viscosity of 15,000 mPa·s of 25° C. and containing 40% of the MQ resin remained. It will be referred to as the liquid resin formed from MQ resin containing 3.4% of OH and from hydroxylated dimethyl oil V 750;

(9) a liquid resin prepared according to the following procedure:

68 parts of the 60% solution of the MQ resin containing 1.3% of OH radicals in toluene and 60 parts of the hydroxylated dimethyl oil V 750 were introduced into a distillation apparatus. The mixture was heated to 130° C. at reduced pressure which stabilized at about 35 millibars. Water and toluene were removed. A liquid resin having a viscosity of 16,000 mPa·s at 25° C. and containing 40% of MQ resin remained. It will be referred to as the liquid resin formed from MQ resin containing 1.3% of OH and from hydroxylated dimethyl oil V 750;

(10) a liquid resin consisting of $CH_3SiO_{1.5}$ and $(CH_3)_2SiO$ units, with a $CH_3/Si$ ratio of 1.3, containing 2.5% of OH radicals, having a viscosity of 5,500 mPa·s at 25° C., with an $\overline{Mn}$ of 3,500 (thus, it contained 5.1 OH radicals per mole). It will be referred to as the liquid resin containing 2.5% of OH and with $CH_3/Si$ of 1.3;

(11) a linear methyl hydropolysiloxane polymer with a viscosity of 25 mPa·s at 25° C., consisting of approximately 50 methylhydrosiloxy units, blocked by a trimethylsiloxy unit at each end of its chain. It will be referred to as the methylhydropolysiloxane polymer;

(12) ground quartz having a mean particle diameter of 5 μm. It will be referred to as ground quartz;

(13) a carbon black paste; it consisted of 15% of a sulfur-free carbon black and 88% of dimethyl oil V 20. It will be referred to as carbon black paste;

(14) a catalyst solution containing 0.25% of platinum metal; this solution was prepared by stirring, at ambient temperature, a mixture comprising 0.6 part of chloroplatinic acid, 10 parts of isopropanol, 55 parts of xylene, and 6 parts of 1,1,3,3-tetramethyl-1,3-divinyldisiloxane. It will be referred to as the catalyst solution containing 0.25% of platinum;

(15) a mixture of methylvinylcyclopolysiloxanes containing 90% of 1,3,5,7-tetramethyl-1,3,5,7-tetravinylcyclotetrasiloxane. It will be referred to as methylvinylcyclopolysiloxane.

Insofar as the preparation of the foams and their physical characteristics are concerned, note was taken of:

(i) the viscosity of each of the parts $A_1$ and $B_1$, (ii) the setting time, that is to say, the time of foam formation, calculated from the time at which the two parts $A_1$ and $B_1$ are mixed, (iii) the density of the foams, (iv) the average number of hydroxyl radicals per mole (called OH/mole), calculated for the mixture comprising all the hydroxylated organopolysiloxane polymers used in each foam formulation.

These hydroxylated organopolysiloxane polymers were selected from among hydroxylated dimethyl oils of V 3500, V 750, V 60, and V 35, MQ resins containing 3.4 and 1.3 OH and the liquid resin containing 2.5% OH and with a $CH_3/Si$ ratio of 1.3.

To calculate the value of the ratio OH/mole, it was assumed that the MQ resins containing 3.4 and 1.3% of OH after reacting with the dimethyl oil V 20, or the vinylated dimethyl oil V 3,500, or the hydroxylated dimethyl oil V 750, retained their initial characteristics; this also applied for the oils which react with these resins.

(v) the molar ratio SiH/SiOH (called H/OH), based on the initial reactants, that is to say, the methylhydropolysiloxane polymer and the hydroxylated organopolysiloxane polymers, (vi) the flame resistance of the foams.

To determine this resistance, a foam cylinder 100 mm in height and 70 mm in diameter was first produced by casting; after aging for one week in open air, the foam was placed vertically above the flame of a Meker burner.

The base of the foam cylinder was 1 cm above the flame cone which was heated at 1,000° C. The cylinder was maintained under these conditions for three hours. The state of the foam was then examined and the fraction of the foam still remaining unaffected, if any, was determined; the state of the burned portion was also noted, especially ash behavior: brittle, relatively non-brittle.

All of these results, together with the compositions $A_1$ and $B_1$ of the various foam formulations are reported in the following table. The six examples which fall within the scope of the invention are referred to as E.1, E.2, E.3, E.4, E.5 and E.6; the four comparative examples without the scope of the invention are referred to as $C_1$, $C_2$, $C_3$ and $C_4$.

TABLE

| | E.1 | | E.2 | | E.3 | | E.4 | | E.5 | | E.6 | | C₁ | | C₂ | | C₃ | | C₄ | |
|---|---|---|---|---|---|---|---|---|---|---|---|---|---|---|---|---|---|---|---|---|
| | A₁ | B₁ | A₁ | B₁ | A₁ | B₁ | A₁ | B₁ | A₁ | B₁ | A₁ | B₁ | A₁ | B₁ | A₁ | B₁ | A₁ | B₁ | A₁ | B₁ |
| Vinylated dimethyl oil V 100,000 | 100 | | 100 | | | | 100 | | | | 100 | | | | 490 | | | 100 | 100 | | |
| Vinylated dimethyl oil V 3,500 | | 390 | | 400 | | 500 | | 400 | | 500 | | 390 | | 500 | | 690 | | 265 | | 390 |
| Dimethyl oil V 1,000 | | 300 | | 300 | | | | 300 | | | | 300 | | 230 | | | | 320 | | 300 |
| Dimethyl oil V 100 | 60 | | 60 | | | | 60 | | 150 | | 84 | | 140 | | | | 60 | | 60 | |
| Dimethyl oil V 50 | | | | | 140 | | | | | | | | 585 | | | | | | | |
| | | | | | 210 | | | | | | | | | | | | | | | |
| Hydroxylated dimethyl oil V 3,500 | 275 | | 200 | | 100 | | 275 | | 450 | | 275 | | 100 | | | | 350 | | 500 | |
| Hydroxylated dimethyl oil V 750 | | | | | | | | | | | | | | | 100 | | | | | |
| Hydroxylated dimethyl oil V 60 | 23 | | 20 | | | | 23 | | 40 | | | | | | 250 | | 40 | | 25 | |
| Hydroxylated dimethyl oil V 35 | | | | | | | | | | | | | | | | | | | | |
| Liquid resin formed from MQ resin containing 3.4% OH and dimethyl oil V 20 | 375 | | 500 | | 375 | | | | | | 375 | | | | | | 375 | | | |
| Liquid resin formed from MQ resin containing 3.4% OH and vinylated dimethyl oil V 3,500 | | | | | | | 375 | | | | | | | | | | | | | |
| Liquid resin formed from MQ resin containing 3.4% OH and hydroxylated dimethyl oil V 750 | | | | | | | | | | | | | | | | | | | | |
| Liquid resin formed from MQ resin containing 1.3% OH and hydroxylated dimethyl oil V 750 | | | | | | | | | 200 | | | | | | | | | | | |
| Liquid resin containing 2.5% OH and with CH₃/Si 1.3 | | | | | | | | | | | | | | | | | | | | |
| Methylhydropolysiloxane polymer | 150 | | 150 | | 150 | | 150 | | 150 | | 150 | | 150 | | 150 | | 150 | | 150 | |
| Ground quartz | 11 | | 11 | | 11 | | 11 | | 11 | | 11 | | 11 | | 11 | | 11 | | 11 | |
| Carbon black paste | 11 | | 11 | | 11 | | 11 | | | | 11 | | 11 | | 11 | | 11 | | 11 | |
| Catalyst solution containing 0.25% Pt | 11 | | 0.5 | | | | | | | | 0.5 | | | | 0.3 | | | | | |
| Methylvinylcyclopolysiloxane | | | | | | | | | | | | | | | | | | | | |
| Viscosity, mPa·s at 25° C. | 2400 | 600 | 6800 | 1400 | 2500 | 900 | 3000 | 1400 | 10000 | 3360 | 3000 | 600 | 1800 | 900 | 2200 | 2000 | 3500 | 1200 | 3000 | 1400 |
| Setting time in sec | 90 | 160 | 70 | 160 | 90 | 130 | 90 | 160 | 190 | | 100 | 160 | 90 | 130 | 110 | 160 | 120 | 160 | 70 | 160 |
| | 270 | 150 | 250 | 150 | 250 | 150 | 270 | 150 | 270 | | 330 | 150 | 240 | 150 | 310 | 150 | 320 | 150 | 280 | 150 |
| Density in kg/m³ | 4 | | 8.5 | | 2.9 | | 2.8 | | 2.9 | | 5.6 | | 2 | | 2.7 | | | | 2 | |
| OH/mole | 4.6 | | 2 | | 3.2 | | 6.7 | | | | 6.2 | | 7.1 | | 5.2 | | | | 11.9 | |
| H/mole | | | | | | | | | | | 0.5 | | | | | | | | | |
| Flame resistance | 30%* | | 30%* | | 30%* | | 30%* | | 35%* | | 28%* | | 25%* | | ** | | 10%* | | 15%* | |

*Percentage corresponding to the unburned part (of the foam); relatively nonbrittle ash
**Foam burned completely; brittle ash.

From the results recorded in the Table, it will be seen that the foams of Examples E.1 to E.5 resist burning remarkably well. The foam of Example E.6 has a somewhat lower burn resistance; this foam had been produced from a composition which was identical to that in Example E.1, except that the hydroxylated dimethyl oil V 35 was not used; the absence of this low-viscosity oil interfered slightly with cell formation. The foam had a coarser structure and a higher density.

As above indicated, Examples $C_1$ to $C_4$ were given for comparison.

The composition used in Example $C_1$ differed from those in Examples E.1 to E.6 in the absence of liquid resin; however, it contained a dimethyl oil V 50 and a hydroxylated dimethyl oil V 60; since it contained only hydroxylated organopolysiloxane polymers of a linear structure, it had a number of OH per mole of 2.

It produced a foam whose flame resistance was inferior to that of the foams in Examples E.1 to E.6. This inferior burn resistance, which follows from the comments made in the Table, was even more markedly demonstrated by the following test, which reproduced in practice the deterioration conditions to which fire-arrest components are subjected in industrial applications, during a fire.

A block of foam was placed in a hopper consisting of a parallelepipedal frame made of welded steel, 400×400×250 mm in size; the block was substantially of the same size and was produced from the foaming composition of Example E.1.

The hopper was placed horizontally on a furnace, and replaced the cover of the latter; in this position, the furnace burner was perpendicular to the two large parallel faces of the foam block, and its flame cone, heated at 1100° C., was 1 cm away from the large face surface which faced the furnace.

The foam of Example E.1 withstood the heating test for 180 min. At the end of this time the foam had been burned to a depth of approximately 180 mm; the remainder of the foam had retained its flexibility and its initial qualities.

This test was repeated by replacing the foam of Example E.1 with that of the Comparative Example C.1. After 150 minutes of heating, the foam had been burned throughout its thickness; it thus did not meet the requirement of withstanding the flame for three hours.

The composition prepared in Comparative Example $C_2$ produced a foam which resisted burning very poorly. This was due to two factors:

(1) the use of a liquid resin prepared by heating an MQ resin containing 3.4% of OH with a dimethyl oil V 20; this oil showed little or no reactivity towards the MQ resin, (2) the absence of a suitable amount of a dimethyl oil of the type V 1,000, V 100 or V 50, the amount of dimethyl oil V 20 introduced through the use of the liquid resin was well below the required lower limit.

The composition prepared in Comparative Example $C_3$ produced a foam of better quality than that produced from the composition prepared in Example $C_2$. However, this foam had a burn resistance which was still low; the principal reason for this fault was the use of a liquid resin prepared by heating an MQ resin containing 3.4% of OH with a vinylated dimethyl oil V 3,500 (this oil may be considered to be relatively unreactive towards the MQ resin).

The composition prepared in Comparative Example $C_4$ contained substantially the constituents of the composition of Example E.2; however, it did not contain the liquid resin formed from the MQ resin containing 3.4% of OH and from the hydroxylated dimethyl oil V 750; the foam produced from this composition had a burn resistance which was barely average.

With regard to the density value of the foams produced from the compositions of Examples E.1 and E.6, and of the compositions of the Comparative Examples C.1 to C.4, it was found that the presence or the absence of liquid resins in these compositions had no marked effect on this value; thus, the compositions of Examples $C_1$ and $C_4$, devoid of liquid resin, produced foams having a density, respectively, of 240 and 280 kg/m$^3$, values which are close to those for the foams produced from the compositions of Examples E.1 to E.5.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organopolysiloxane composition adopted for conversion into burn resistant foam, comprising (A) a diorganopolysiloxane oil blocked at each chain end by a vinyl diorganosiloxy unit, in which the organic radicals bonded to the silicon atoms are methyl, ethyl, n-propyl, vinyl, phenyl, and/or 3,3,3-trifluoropropyl radicals, and having a viscosity of 100 to 250,000 mPa·s at 25° C., (B) a diorganopolysiloxane oil blocked at each chain end by a triorganosiloxy unit, in which the organic radicals bonded to the silicon atoms are methyl, ethyl, phenyl and/or 3,3,3-trifluoropropyl radicals, and having a viscosity of 10 to 5,000 mPa·s at 25° C., (C) a diorganopolysiloxane oil blocked at each chain end by a hydroxyl radical, in which the organic radicals bonded to the silicon atoms are methyl, ethyl, phenyl and/or 3,3,3-trifluoropropyl radicals, and having a viscosity of 5 to 10,000 mPa·s at 25° C., (D) a liquid resin which comprises (i) a resin containing units of the formulae $CH_3SiO_{1.5}$ and $(CH_3)_2SiO$, in a $CH_3/Si$ ratio of 1.1 to 1.6, having a weight content of 1 to 6% of hydroxyl radicals bonded to the silicon atoms, and having a viscosity of 1,500 to 20,000 mPa·s at 25° C., (2i) the reaction product of a solution, in an organic solvent, of a silicone resin containing units of the formulae $(CH_3)_3SiO_{0.5}$ and $SiO_2$, the molar ratio $(CH_3)_3SiO_{0.5}/SiO_2$ of which ranges from 0.4 to 1.2, having 0.6 to 5.5 mole percent of hydroxyl radicals bonded to the silicon atoms, interracted with a diorganopolysiloxane oil blocked at each chain end by a hydroxyl radical bonded to the terminal silicon atom, in which the organic radicals bonded to the silicon atoms are methyl, ethyl, phenyl and/or 3,3,3-trifluoropropyl radicals, and having a viscosity of 10 to 4,000 mPa·s at 25° C., the weight ratio of the silicone resin to the diorganopolysiloxane oil being 0.1 to 1.0, or (3i) the mixture of the resin (i) with the reaction product (2i), the weight ratio of the resin (i) to the reaction product (2i) ranging from 0.2 to 5, (E) a liquid organohydropolysiloxane polymer containing at least three SiH groups per mole, (F) an inorganic and/or metal filler, and (G) a catalytically effective amount of a platinum catalyst.

2. The organopolysiloxane composition as defined by claim 1, comprising 100 parts of said diorganosiloxane oil (A), from 50 to 100 parts of said diorganopolysiloxane oil (B), from 25 to 180 parts of said diorganopolysiloxane oil (C), from 10 to 150 parts of said liquid resin (D), from 10 to 40 parts of said liquid organohydropolysiloxane polymer (E), from 30 to 90 parts of said filler (F), and from 0.001 to 0.05 part of said catalyst (G).

3. The organopolysiloxane composition as defined by claim 2, said mixture of oil (C) and resin (D) containing more than 2.5 hydroxyl radicals per mole.

4. The organopolysiloxane composition as defined by claim 3, wherein the molar ratio of the SiH radicals contributed by the polymer (E) to the hydroxyl radicals contributed by the oil (C) and the resin (D) ranges from 1.2 to 25.

5. The organopolysiloxane composition as defined by claim 4, wherein the oil (B) comprises a mixture of an oil having a viscosity of 15 to 100 mPa·s at 25° C. with an oil having a viscosity of 100 to 2,500 mPa·s at 25° C.

6. The organopolysiloxane composition as defined by claim 4, wherein the oil (C) comprises a mixture of an oil having a viscosity of 5 to 150 mPa·s at 25° C. with an oil having a viscosity of 300 to 8,000 mPa·s at 25° C.

7. The organopolysiloxane composition as defined by claim 4, comprising the resin (i) and wherein said resin (i) contains at least 2.9 hydroxyl radicals per mole.

8. The organopolysiloxane composition as defined by claim 4, comprising the reaction product (2i), said product (2i) comprised of an MQ resin having a molar ratio $(CH_3)_3SiO_{1.5}/SiO_2$ ranging from 0.5 to 1.1 and having a weight content of hydroxyl radicals ranging from 0.8 to 5.0%.

9. The organopolysiloxane composition as defined by claim 8, said MQ resin comprising at least 2.8 hydroxyl radicals per mole.

10. The organopolysiloxane composition as defined by claim 4, further comprising from 0.005 to 5 parts of an inhibitor of the platinum catalyst (G) per 100 parts of the vinylated oil (A).

11. The organopolysiloxane composition as defined by claim 1, packaged in two-component form.

12. The organopolysiloxane composition as defined by claim 11, one component comprising a fraction of said diorganosiloxane oil (A), a fraction of said diorganosiloxane oil (B), said diorganosiloxane oil (C), said liquid resin (D), a fraction of said filler (F), and said catalyst (G), and the second component comprising the remainder of said diorganosiloxane oil (A), the remainder of said diorganosiloxane oil (B), said liquid organohydropolysiloxane polymer (E), and the remainder of said filler (F).

* * * * *